3,228,039
FITTING FOR SANITARY PLUMBING FIXTURE
William Freeman, Delphi, Ind., assignor to Globe Valve
Corporation, a corporation of Indiana
Filed Aug. 26, 1963, Ser. No. 304,542
1 Claim. (Cl. 4—206)

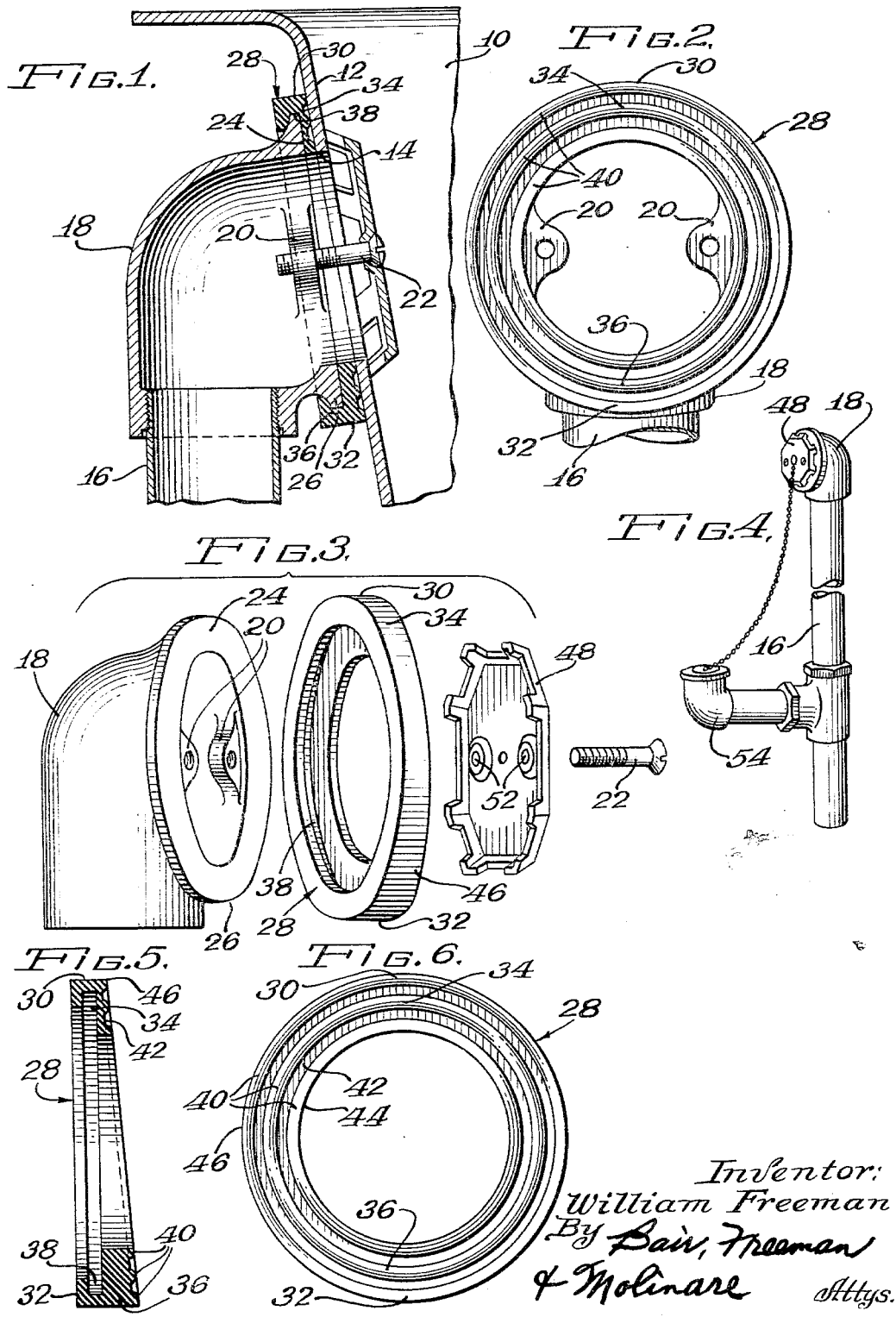

This invention relates to a fitting construction for a sanitary plumbing fixture, which is particularly useful in connection with the overflow construction for the bathtub waste and overflow of various types.

Bathtub waste and overflow fittings are generally provided with a gasket formed of rubber or other resilient material for serving as a seal between the overflow and the bathtub. Generally, the gasket is held in place by means of protruding ears on the overflow head, over which the gasket fits, by means of a collar and gasket, by means of screws and other clamping devices, and by means of pressure between the tub and the overflow head developed by various mechanical means. In prior structures, there is a problem of the gasket slipping or otherwise failing to provide an adequate seal for preventing leakage past the gasket.

Ordinarily the overflow head is positioned with its terminus located in a plane inclined with respect to the opposing face of the bathtub wall. Also, the terminus of the overflow head is not always located in a fully opposing relationship to the facing wall of the bathtub, but may be slightly rotated with respect thereto. This slight rotation causes the terminus of the overflow head to assume varying attitudes with respect to the opposing face of the bathtub wall and this sometimes results in disparities in the spacing between opposed points on the terminus of the overflow head and the upright bathtub wall. Because of such disparities, leaks are likely to develop. Furthermore, due to the irregular surface of the upright wall of the bathtub, clamping pressure applied to the gasket is often insufficient to completely eliminate leakage. A further disadvantage of some prior structures is that they use a large number of parts, thereby increasing the expense of the fitting and also adding to the problem of obtaining a proper seal.

It is therefore a primary object of this invention to provide a novel overflow gasket which is held in place on an overflow head by its own construction and which is adapted to accommodate the variation in attitude between the terminus of the overflow head and the opposing face of the bathtub wall and also to provide for increased sealing pressure between the gasket and the irregular surface of the bathtub wall.

It is another object of this invention to provide a novel gasket structure for use in connection with an overflow head of a bathtub fitting wherein the gasket structure is provided with a sealing face inclined with respect to the plane of the terminus of the overflow head and wherein the gasket is rotatably mounted on the overflow head whereby the rotatability and the tapering of the gasket permit the relocation of the thickest portion of the gasket and of the thinnest portion of the gasket for accommodating variations which occur in the attitude between the terminus of the overflow head and the opposing wall of the tub.

It is a further important object of this invention to provide a gasket for use in connection with the overflow fitting of a bathtub fixture which is provided with circular beads projecting from the outer face of the gasket whereby sealing pressure is increased for insuring a seal between the overflow head and the bathtub wall.

Further purposes and objects of this invention will appear as the specification proceeds.

A particular embodiment of the present invention is illustrated in the accompanying drawings, wherein:

FIGURE 1 is a fragmentary, sectional view of an overflow head in place adjacent the wall of a bathtub;

FIGURE 2 is a front elevational view of the novel gasket in place on an overflow head;

FIGURE 3 is an exploded view, in perspective, of the overflow head, the gasket, and the means for clamping the gasket between the head and the wall of the bathtub;

FIGURE 4 is a perspective view of an assembled overflow and drain fitting for a bathtub;

FIGURE 5 is a sectional view of the novel gasket; and

FIGURE 6 is a front elevational view of the gasket.

In the drawings, 10 designates a portion of a bathtub having an inclined wall 12 with an overflow aperture 14 therein. An overflow tube 16 is connected at its upper end to an overflow head 18, which is provided with inwardly extending ears 20 having threaded openings for receiving screws 22. The overflow head 18 is also provided with an annular lateral terminus 24 which faces the outer surface of the upright wall 12 and lies in a plane inclined with respect to the wall 12. The head 18 also includes an outwardly extending continuous collar 26. The annular terminus 24 and the collar 26 are pivotable about the longitudinal axis of the upright tube 16, in order to provide for variation in the relative attitude between the annular terminus 24 and the wall 12 and also to accommodate for the disparity of spacing between opposed points of the terminus 24 and the wall 12 of the tub 10.

A resilient gasket 28, formed of rubber or other suitable resilient material, is provided for connection to the overflow head 18. Preferably, the gasket 28 is tapered from its upper portion 30 downwardly and laterally to its bottom portion 32, thereby providing a relatively thin portion 34 and a relatively thick portion 36.

The gasket 28 is provided interiorly with a continuous recess 38 which is adapted to receive the collar 26 of the overflow head 18, the collar being of substantially uniform thickness throughout. The recess 38 allows the gasket 28 to be rotatable upon the collar 26 by cooperation between the continuous recess 38 and the collar 26.

The gasket 28 is adapted to resiliently grip the outwardly extending collar 26 of the overflow head 18 in order to prevent dislodgement of the gasket, as during installation, from the overflow head 18.

The rotatability of the tapered gasket 28, together with the tapering thereof, permits the relocation of its relatively thick portion 36 and its relatively thin portion 34 so as to accommodate for the variations which occur in the attitude between the terminus 24 of the overflow head 18 and the opposing wall 12 of the tub 10.

It is an important feature of the present invention that generally circular, concentric beads 40 be provided on the outermost face 42 of the gasket 28. The beads 40 are raised or project outwardly from the outer face 42. Advantageously, three beads 40 are provided, one of the beads 40 being along the inner edge 44 of the annular face 42 of the gasket 28, the second of the beads 40 being at the outer edge 46 of the annular face 42, and third of the beads 40 being disposed between said first and second beads. The beads 40 are adapted to provide for increased sealing pressure for the same amount of clamping force exerted by the face plate 48, since a smaller surface area receives a given force. The face plate 48 is positioned at the overflow aperture 14, at the inner side of the wall 12; a threaded screw 22 is then passed through the openings 52 in the plate 48 and into the threaded openings in the ears 20 of the head 18 in order to draw the head 18 forwardly to clamp the gasket 28 tightly between the flange or collar 26 and the outer surface of the inclined wall 12. Thus, the beads 40 are adapted to provide greater sealing pressure. The provision of three concentric beads 40 substantially eliminates the possibility of leakage past the gasket 28 since if there is leakage past one bead, the chances of leakage past an adjacent bead are greatly reduced.

Therefore, it is seen that all of the aforementioned objects have been accomplished by the described fitting construction with the novel gasket. When the drain fitting 54 is properly positioned in the bottom drain of the bathtubs, the terminus 24 of the overflow head 18 may be at a bearing attitude relative to the opposing face of the bathtub wall 12. In order to accommodate for this variation, the gasket 28 may be rotated about the collar 26, thereby allowing the relocation of the thick and thin portions of the gasket 28. Of further importance, when the face plate 48 is tightened against the wall 12 by the force of the screws 22, the gasket 28 is squeezed between the terminus 24 and the outer surface of the inclined wall 12, whereby the relatively small surface area of the beads 40 provides an increased sealing pressure so as to seal any surface irregularities of the wall 12. Also, a relatively small number of assembly parts are used.

While in the foregoing there has been a detailed description of a specific embodiment of the present invention, it is to be understood that all equivalents obvious to those having skill in the art are to be included within the scope of the invention, as claimed.

What I claim and desire to secure by Letters Patent is:

In a bathtub structure having an upright wall provided with an overflow opening, and having a drain and fittings therefor including a generally upright tube; an overflow head on said upright tube defining an annular lateral terminus disposed in facing relationship with said upright wall and lying in a plane inclined with respect to said upright wall; said annular lateral terminus being pivotable about the longitudinal axis of said upright tube, thereby providing for variations in the relative attitude between the annular terminus of the overflow head and the upright wall of the bathtub; a resilient gasket rotatably mounted on said overflow head and having an outer face disposed in a plane inclined with respect to the plane of said terminus of said overflow head; said resilient gasket having circular bead means projecting from the outer face thereof so as to provide increased sealing pressure; the rotatability of said gasket on said overflow head, the inclination of the plane of outer face of said gasket, relative to the plane of the terminus of said overflow head, and said circular beads on the outer face of said gasket, cooperating to provide means for accommodating the disparity of spacing between opposed points on the terminus of the overflow head and on the upright wall of the bathtub whereby leakage past the gasket is substantially avoided; means for clamping the overflow head to the bathtub in register with the overflow opening therein and with said gasket in sealing relationship between said bathtub and said overflow head; and the rotatable mounting for said gasket comprising means on said overflow head defining an annular outwardly extending collar lying in a plane parallel to the plane of the terminus of said overflow head, said gasket defining an annular continuous recess adapted to receive said annular collar therein, and said gasket being operative to resiliently grip said outwardly extending collar on said overflow head in the proper attitude for contacting the upright wall of the bathtub to prevent dislodgement of said gasket, during installation thereof, from said overflow head or from any attitude to which it has been rotated, said circular bead means comprising three beads disposed in concentric relationship, the first of said beads being located along the innermost edge of said gasket, the second of said beads being located at the outer edge of said gasket, and the third of said beads being disposed between said first and second beads.

References Cited by the Examiner

UNITED STATES PATENTS

| 854,234 | 5/1907 | Perry | 277—207 X |
| 1,870,089 | 8/1932 | Bloch | 4—199 |
| 1,901,118 | 3/1933 | Pope | 4—199 |
| 2,593,410 | 4/1952 | Buckendale | 277—207 X |

LAVERNE D. GEIGER, *Primary Examiner.*

H. GROSS, *Assistant Examiner.*